(12) United States Patent
Marotta et al.

(10) Patent No.: US 9,490,623 B2
(45) Date of Patent: Nov. 8, 2016

(54) CAPACITVIVE LOAD OVERCURRENT DETECTION SYSTEM AND METHOD

(71) Applicant: HONEYWELL INTERNATIONAL INC., Morristown, NJ (US)

(72) Inventors: Joseph Marotta, Boonton, NJ (US); Nasrullah Habeeb M, Kerala (IN); Rajamohan Revindranathan, Karnataka (IN); John Dylan Michael, Oro Valley, AZ (US); Dale Trumbo, Tucson, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 177 days.

(21) Appl. No.: 14/546,145

(22) Filed: Nov. 18, 2014

(65) Prior Publication Data
US 2016/0141859 A1    May 19, 2016

(51) Int. Cl.
*H02H 3/08*    (2006.01)

(52) U.S. Cl.
CPC ...................... *H02H 3/08* (2013.01)

(58) Field of Classification Search
CPC ........................................................ H02H 3/08
See application file for complete search history.

(56) References Cited

U.S. PATENT DOCUMENTS

| | | | | |
|---|---|---|---|---|
| 3,517,301 A | * | 6/1970 | Huber | H02M 3/156 323/285 |
| 5,079,455 A | | 1/1992 | McCafferty et al. | |
| 7,280,335 B2 | | 10/2007 | Pritchett et al. | |
| 7,468,877 B2 | | 12/2008 | Oki et al. | |
| 2009/0009146 A1 | * | 1/2009 | Rozman | H02P 29/027 322/27 |
| 2013/0214806 A1 | | 8/2013 | Saloio, Jr. et al. | |

* cited by examiner

*Primary Examiner* — Thienvu Tran
*Assistant Examiner* — Tien Mai
(74) *Attorney, Agent, or Firm* — Lorenz & Kopf, LLP (57) ABSTRACT

An overcurrent detection circuit and method for one or more capacitive loads includes sensing current being supplied to the one or more capacitive loads to thereby generate a sensed current, and sensing a voltage rate of change across the one or more capacitive loads to thereby generate a differentiator output. The differentiator output is added to a fixed reference setpoint to thereby generate an overcurrent setpoint. The sensed current is compared to the overcurrent setpoint, and an overcurrent trip signal is supplied when the sensed current is greater than or equal to the overcurrent setpoint.

17 Claims, 4 Drawing Sheets

CAPACITVIVE LOAD OVERCURRENT DETECTION SYSTEM AND METHOD

TECHNICAL FIELD

The present invention generally relates to overcurrent detection, and more particularly relates to systems and methods for detecting overcurrent in one or more capacitive loads.

BACKGROUND

Some control systems include valves that are motor driven. In many of these systems, the motor driver circuitry includes a relatively large capacitor bank to provide local power to the motor driver. For efficient operation, the capacitor bank is charged to the same voltage as the supplied power rail. During initial power-up, or numerous other events during which the input voltage ramps up, a relatively heavy inrush current charges the capacitor bank.

As may be appreciated, the motor driver circuitry is preferably provided with protection circuitry to provide protection from an external short circuit. In particular, the protection circuitry is preferably configured to detect if the current increases beyond a predetermined limit, and immediately shut the motor driver circuitry down before any component failure.

In some aircraft, environmental interference, such as audio frequency interference, with the power lines could cause repeated inrush currents as the capacitor bank is being charged. This is potentially more troublesome than power-up inrush current. This is because the power-up inrush current occurs only once, whereas the environmental interference may cause the inrush to repeat multiple times in a short period. There are various other scenarios in which it is preferable to distinguish relatively heavy inrush currents a fault current. The challenge is to design a circuit that detects short circuit faults, and that is able to distinguish the heavy currents caused by capacitor charging from short circuit faults.

A traditional method for distinguishing these two events is to implement a time delay before detecting an over current. With this method, an overcurrent condition is detected only if the overcurrent condition exists for a certain time period. This method can be ineffective in many scenarios because the time to charge the capacitor bank is sufficient to damage the circuit in case of a short circuit. Also in the case of a short circuit, the power supply input will not see heavy current until the capacitor bank discharges through the short circuit, which can damage components. To overcome this shortcoming, the short circuit needs to be detected as early as possible, which does not allow for a delay to accommodate the current for charging the capacitor bank.

Another method is to clear an overcurrent latch once after providing sufficient time to charge the capacitors. Only in cases where the overcurrent occurs multiple times in a short span will an overcurrent condition be considered and the motor driver shutdown. This method will not work in scenarios like the above-described audio frequency interference, where an overcurrent may be detected multiple times.

Hence, there is a need for a system and method that is capable of distinguishing between a fault/short circuit overcurrent and an overcurrent that may be caused by capacitive load/capacitor bank charging/discharging. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an overcurrent detection circuit for one or more capacitive loads includes a comparator, a differentiator, and a summer. The comparator is adapted to receive a sensed current signal and is coupled to receive a setpoint signal. The sensed current signal is representative of current being supplied to the one or more capacitive loads, and the setpoint signal is representative of an overcurrent setpoint. The comparator is configured to supply an overcurrent trip signal when the current supplied to the one or more capacitive loads is greater than or equal to the overcurrent setpoint. The differentiator is adapted to sense a voltage rate of change across the one or more capacitive loads and is configured to supply a differentiator output signal representative thereof. The summer is coupled to receive a fixed reference setpoint signal and the differentiator output signal and is configured, upon receipt thereof, to add the fixed reference setpoint signal and the differentiator output signal to thereby generate the setpoint signal and supply the setpoint signal to the comparator.

In another embodiment, an overcurrent detection circuit for one or more capacitive loads includes one or more controllable switches, conditioning circuitry, a comparator, a differentiator, and a summer. The controllable switches are coupled in series with the one or more capacitive loads. Each controllable switch is configured to operate in an ON state, in which current may flow through the switch to the one or more capacitive loads, and an OFF state, in which current is prevented from flowing through the switch to the one or more capacitive loads. The conditioning circuitry is coupled to the comparator and is adapted to receive a current sensor output signal representative of current being supplied to the one or more capacitive loads and is configured, upon receipt thereof, to condition the current sensor output signal and supply a sensed current signal. The comparator is coupled to receive the sensed current signal and a setpoint signal that is representative of an overcurrent setpoint. The comparator is configured to supply an overcurrent trip signal when the current supplied to the one or more capacitive loads is greater than or equal to the overcurrent setpoint. The differentiator is adapted to sense a voltage rate of change across the one or more capacitive loads and is configured to supply a differentiator output signal representative thereof. The summer is coupled to receive a fixed reference setpoint signal and the differentiator output signal and is configured, upon receipt thereof, to add the fixed reference setpoint signal and the differentiator output signal to thereby generate the setpoint signal and supply the setpoint signal to the comparator.

In yet another embodiment, a method of detecting an overcurrent condition in a circuit that includes one or more capacitive loads includes sensing current being supplied to the one or more capacitive loads to thereby generate a sensed current, sensing a voltage rate of change across the one or more capacitive loads to thereby generate a differentiator output, adding the differentiator output to a fixed reference setpoint to thereby generate an overcurrent setpoint, comparing the sensed current to the overcurrent setpoint, and supplying an overcurrent trip signal when the sensed current is greater than or equal to the overcurrent setpoint.

Furthermore, other desirable features and characteristics of the overcurrent condition detection system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
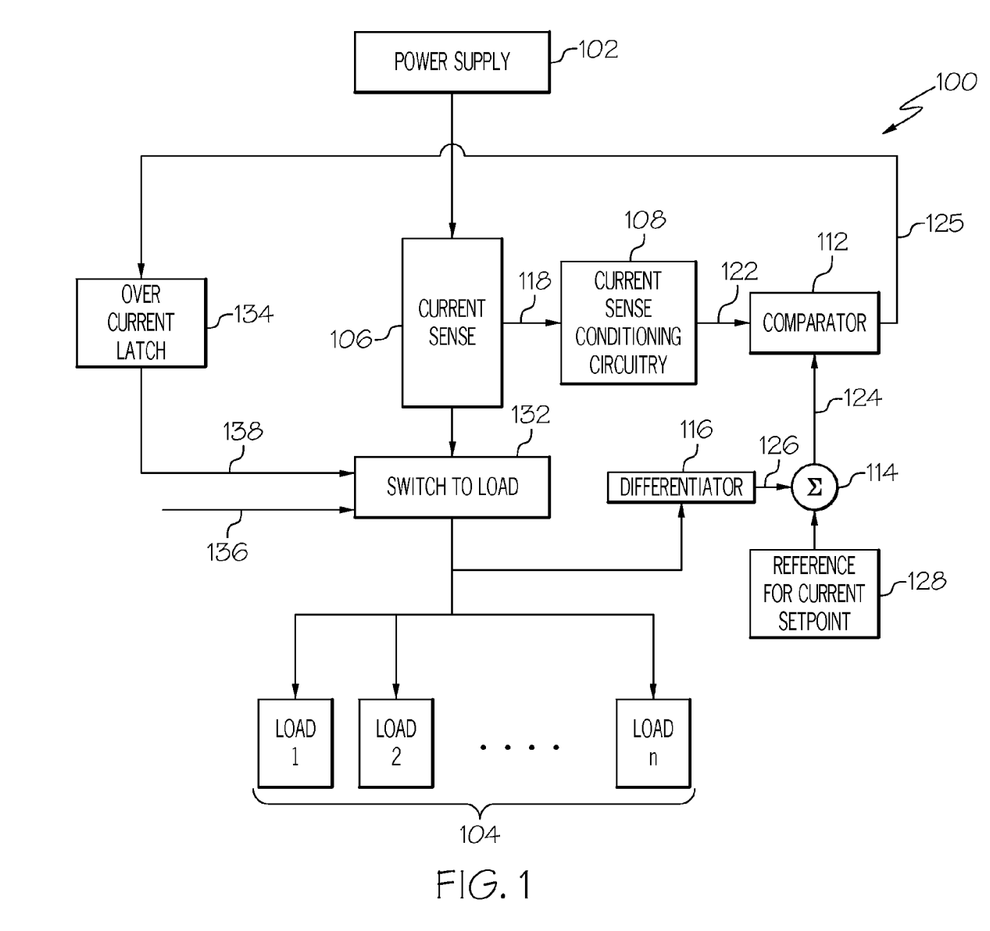
FIG. 1 depicts a functional block diagram of one example embodiment of an overcurrent detection circuit.

Referring first to FIG. 1, a functional block diagram of one embodiment of an overcurrent detection circuit 100 is depicted. The overcurrent detection circuit 100 is preferably configured to detect an overcurrent condition in a system in which a power supply 102 is being used to supply electrical power to a plurality of loads 104 that includes one or more capacitive loads. In the depicted embodiment, the power supply 102 is being used to supply N-number of loads 104, which may include a plurality of capacitive loads, such as a capacitor bank associated with a non-illustrated motor. It will be appreciated, however, that the overcurrent detection circuit 100 could be used in a system that includes only a single capacitive load.

Regardless of the number of capacitive loads 104, the overcurrent detection circuit 100 includes a current sensor 106, conditioning circuitry 108, a comparator 112, a summer 114, and a differentiator 116. The current sensor 106 is configured to sense the current being supplied to the one or more capacitive loads 104, and supplies a current sensor output signal to the conditioning circuitry 108 that is representative of the sensed current. It will be appreciated that the current sensor 106 may be implemented using any one of numerous current sensors now known or developed in the future. For example, the current sensor 106 may be implemented using a resistance circuit, a Hall sensor, a current transformer, a Rogowski coil. In the depicted embodiment, however, the current sensor 106 is implemented using a relatively simple resistance circuit.

The conditioning circuitry 108 is coupled to receive the current sensor output signal 118. The conditioning circuitry 108 is configured to condition the current sensor output signal 118 and supply a sensed current signal 122 to the comparator 112. It will be appreciated that the conditioning circuitry 108 may be implemented using any one of numerous known signal conditioning circuit topologies now known or developed in the future.

The comparator 112 is coupled to receive the sensed current signal 122 and a setpoint signal 124. The sensed current signal 122, as noted above, is representative of the current being supplied to the one or more capacitive loads 104, and the setpoint signal 124 is representative of an overcurrent setpoint. The comparator 112 is configured to compare these two signals 122, 124, and to supply an overcurrent trip signal 125 when the current supplied to the one or more capacitive loads 104 is greater than or equal to the overcurrent setpoint 124.

The overcurrent setpoint 124 is supplied to the comparator 112 from the summer 114. As FIG. 1 depicts, the summer 114 is coupled to receive an output signal 126 from the differentiator 116 and a fixed reference setpoint signal 128. The summer 116 is configured to add the fixed reference setpoint signal 128 and the differentiator output signal 126 to thereby generate the setpoint signal 124 and supply it to the comparator 112.

The differentiator 116 is configured to sense the voltage rate of change across the one or more capacitive loads 104, and supplies the differentiator output signal 126 to the summer 114. As is generally known, the voltage rate of change across a capacitor is equal to the current flowing through the capacitor. Hence, the differentiator 116 is basically sensing current in the one or more capacitive loads 104. It will be appreciated that the differentiator 116 may be implemented using any one of numerous known differentiator topologies. In the depicted embodiment, however, the differentiator 116 is implemented using a capacitor.

Because the summer 114 receives and adds the fixed reference setpoint signal 126 and the differentiator output signal 128, it will be appreciated that the setpoint signal 124 supplied to the comparator 114 is not fixed. Rather, the setpoint signal 124 may vary depending upon whether the differentiator 116 is sensing a voltage rate of change across the one or more capacitive loads 104. The reasoning for, and the resultant of, this feature of the overcurrent detection circuit 100 will be described momentarily. Before doing so, however, the remainder of the depicted circuit will now be described.

The depicted circuit 100 additionally includes a plurality of controllable switches 132 and an overcurrent latch 134. The controllable switches 132 are coupled in series between the power supply 102 and the one or more capacitive loads 104. Each controllable switch 132 is configured to operate in an ON state and an OFF state. In the ON state, current may flow through the switches 132 to the one or more capacitive loads 104. Conversely, in the OFF state, current is prevented from flowing through the switches 132 to the one or more capacitive loads 104.

As FIG. 1 further depicts, the controllable switches 132 are each coupled to receive an ON command 136 and an OFF command 138. The switches 132 are each responsive to the ON command 136 to operate in the ON state, to the OFF command 138 to operate in the OFF state. The ON command 136, at least in the depicted embodiment, is supplied from a non-illustrated, external system. The OFF command 138 is supplied from the overcurrent latch 134.

The overcurrent latch 134 is coupled between the comparator 112 and the controllable switches 132 and is configured to selectively generate and supply the OFF command 138 to the controllable switches 132. In particular, the overcurrent latch 134 is configured to generate the OFF command in response to the comparator 112 supplying the overcurrent trip signal 125.

A more detailed description of how the overcurrent detection circuit operates to detect an overcurrent condition associated with a fault, but not associating the heavy currents caused by capacitor charging with an overcurrent condition will be momentarily described. Before doing so, it is noted that the embodiment depicted in FIG. 1 is configured as a high-side overcurrent detection circuit. In other embodiments, such as the one depicted in FIG. 2, the overcurrent detection circuit 100 may be configured as a low-side circuit, in which the current sensor 106 is coupled in series between the switches 132 and a common or return terminal 202. The embodiment depicted in FIG. 2 operates substantially identical to the one depicted in FIG. 1, and will therefore not be separately described in detail.

Figure 2:
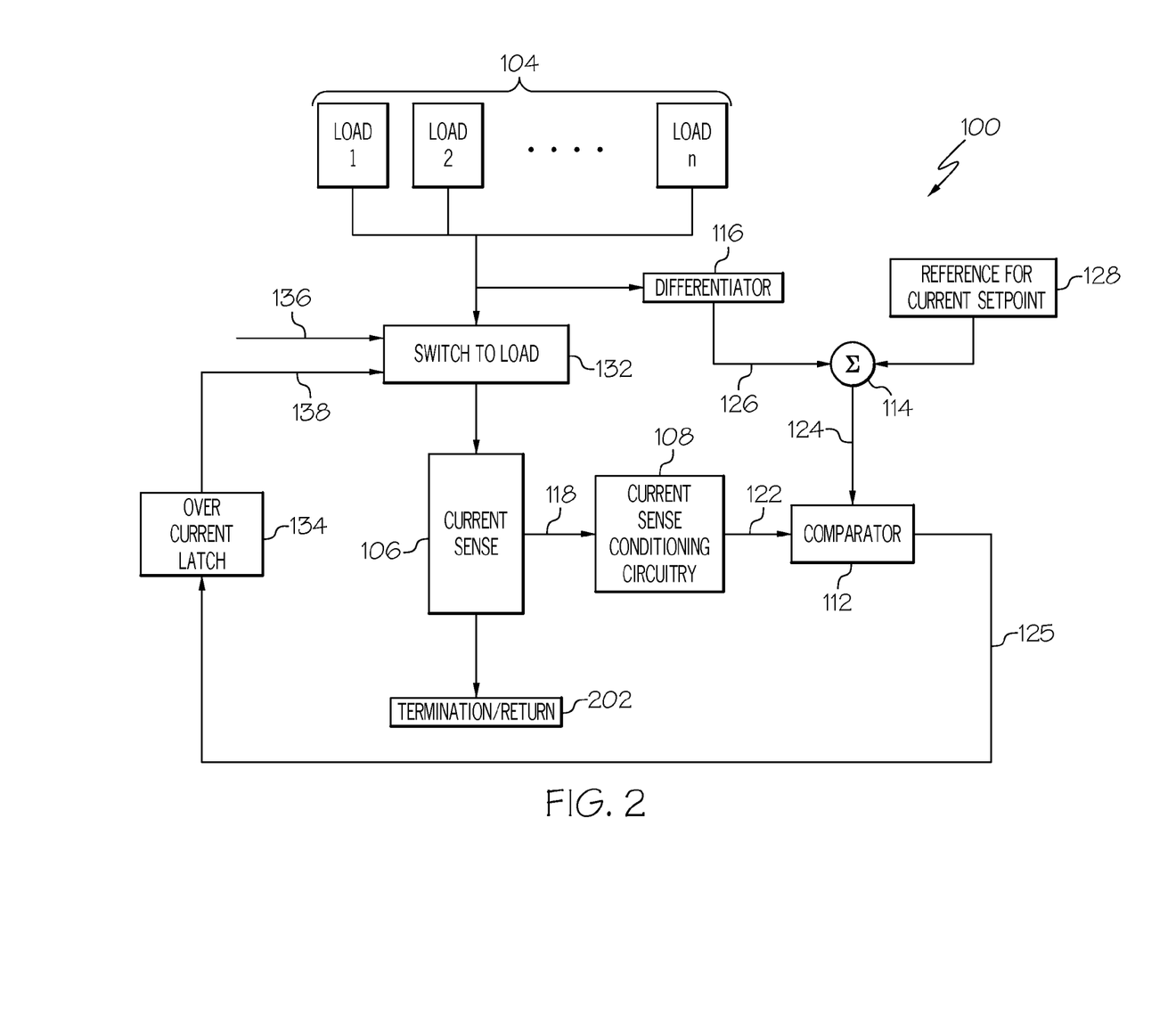
FIG. 2 depicts a functional block diagram of another example embodiment of an overcurrent detection circuit.

The embodiments depicted in bot FIG. 1 and FIG. 2 detect an overcurrent condition by sensing the current being supplied to the one or more capacitive loads 104 and sensing the voltage rate of change across the one or more capacitive loads 104, to thereby generate a sensed current 122 and a differentiator output 126, respectively. The differentiator output is added to a fixed reference setpoint 128 to thereby generate an overcurrent setpoint 124, which is compared to the sensed current 122. If or when the sensed current 122 is greater than or equal to the overcurrent setpoint 124, an overcurrent trip signal 125 is supplied, thereby causing the overcurrent latch 134 to generate the OFF command 138.

Figure 3:
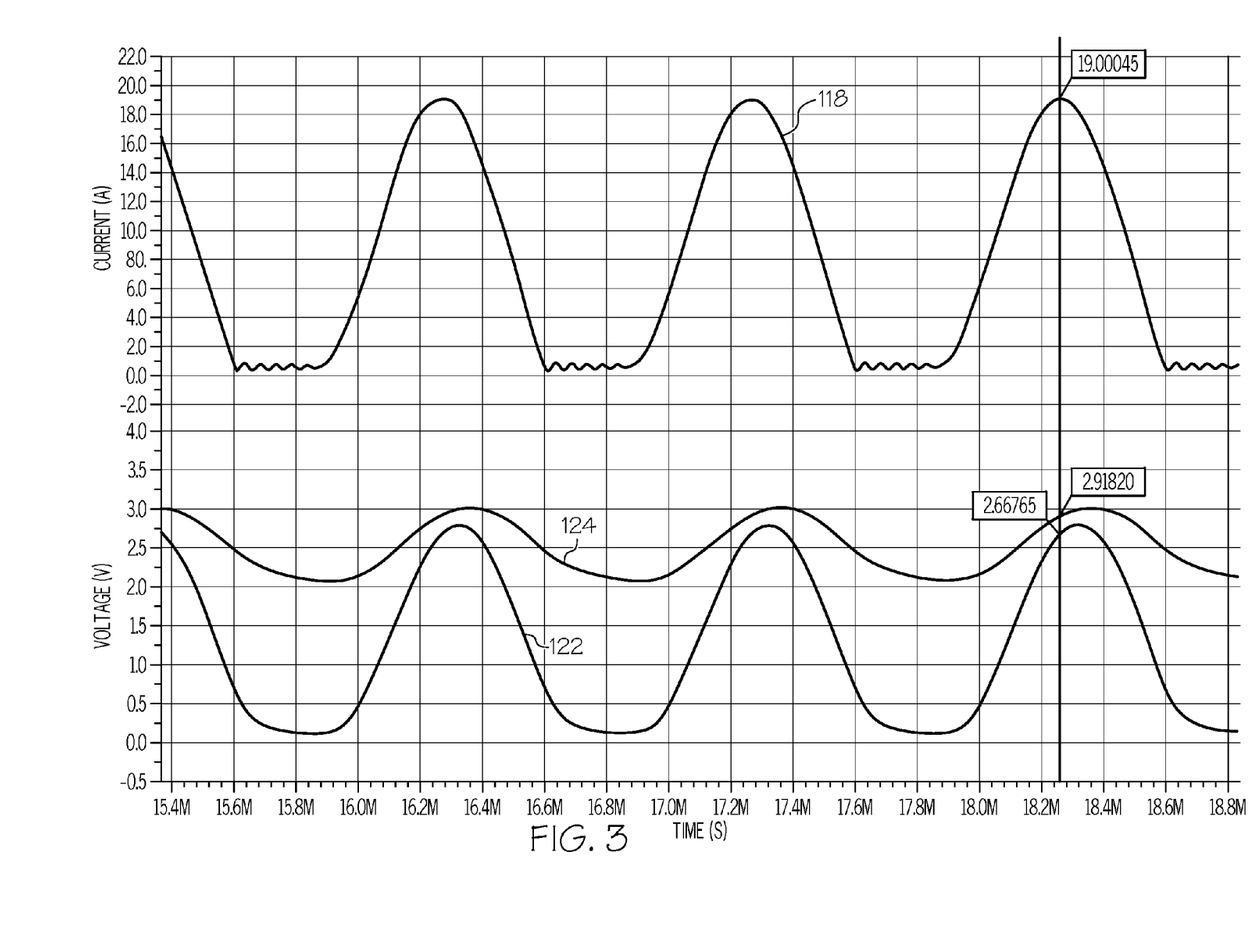
FIG. 3 graphically depicts a response of the overcurrent detection circuit of FIG. 1 to variations in current caused by audio frequency interference.

As was noted above, the overcurrent setpoint signal 124 that is supplied to the comparator 114 is not fixed. Rather, the setpoint signal 124 may vary depending upon whether the differentiator 116 is sensing a voltage rate of change across the one or more capacitive loads 104. For example, FIG. 3 graphically depicts a situation in the power supply 102 is impacted by audio frequency interference. As may be readily seen, during each positive cycle of the audio frequency interference, the current sensor output signal 118 increases up to a relatively high peak value. Although this value may vary, in the depicted example, the peak current reaches 19 amps.

As noted in the description of the overcurrent detection circuit 100, the current sensor output signal 118 is supplied to the current conditioning circuitry 108, which supplies the sensed current signal 122 to the comparator 112. As may be readily seen in FIG. 3, the sensed current signal 122 also increases along with the current sensor output signal 118. However, the comparator 112 does not supply an overcurrent trip signal 125. This is because as the current increases, the voltage at the load 104 also increases as the one or more capacitive loads charge. This causes the setpoint signal 124 to concomitantly increase and remain above the current sensed current signal 122.

Figure 4:
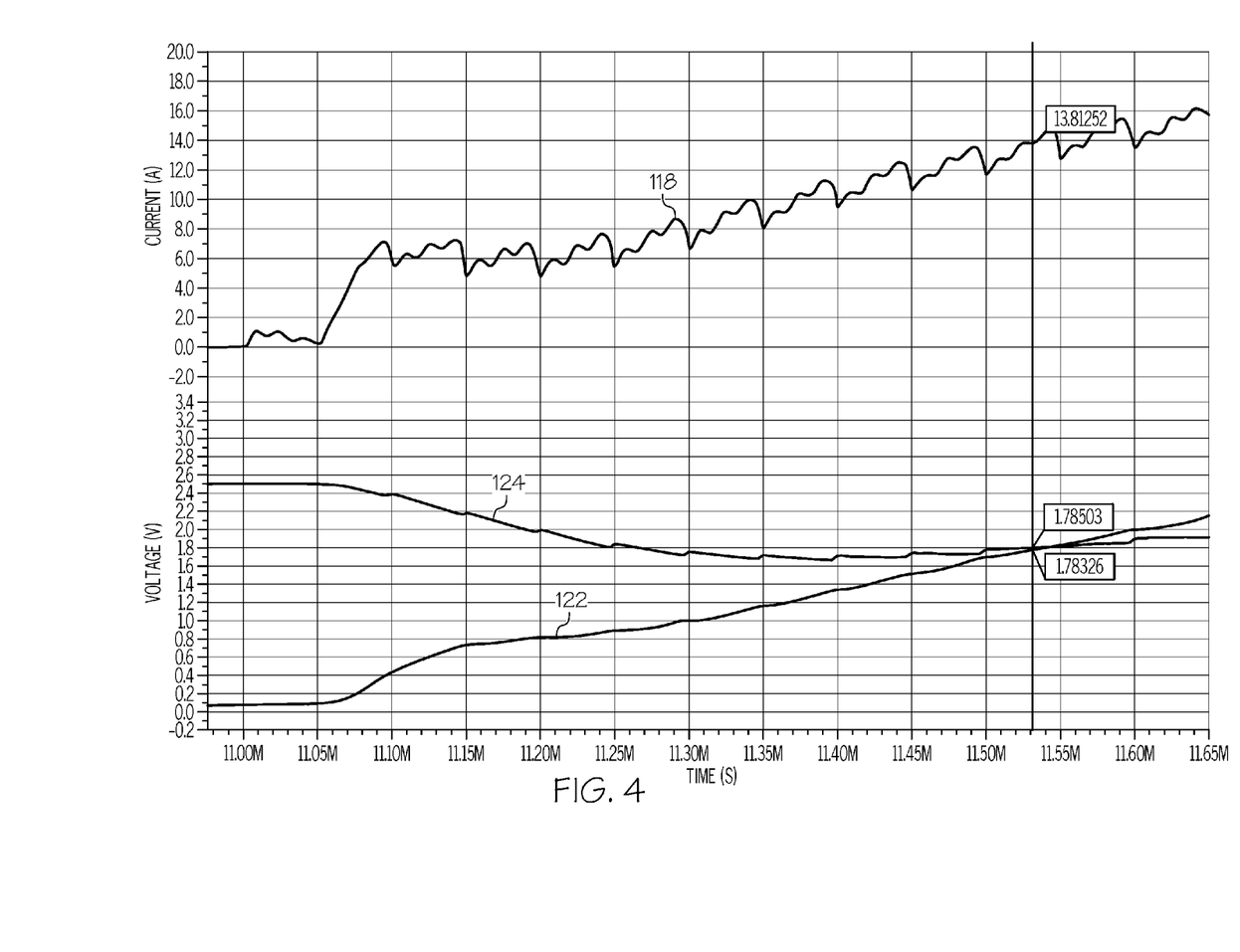
FIG. 4 graphically depicts a response of the overcurrent detection circuit of FIG. 1 to a short circuit condition.

Turning now to FIG. 4, a response of the same circuit 100, which is used to drive a non-illustrated motor, to a short circuit of one of the motor phase outputs is depicted. As this example illustrates, when the short circuit occurs, the current sensor output signal 118 increases. It should be noted that the increase is gradual because of an inductor being present in the path. Nonetheless, as may be readily seen, far before the current sensor output signal 118 reaches a relatively high current, such as the 19 amps that occur during the event depicted in FIG. 3, an overcurrent event is detected.

This is because the capacitive loads discharge when the short circuit occurs, which reduces the voltage at the load 104 and concomitantly lowers setpoint signal 124 supplied to the comparator 112. In the depicted example, it is seen that the setpoint signal 124 decreases from a nominal 2.5 volts to 1.78 volts, at which point the sensed current signal 122 supplied from the current conditioning circuitry 108 is also at 1.78 volts, and the comparator 112 supplies an overcurrent trip signal 125. Hence, the circuit 100 detects an overcurrent when the current reaches 13 amps, which is much less than the 19 amps during the audio frequency interference event of FIG. 3.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An overcurrent detection circuit for one or more capacitive loads, the circuit comprising:
   a comparator adapted to receive a sensed current signal and coupled to receive a setpoint signal, the sensed current signal representative of current being supplied to the one or more capacitive loads, the setpoint signal representative of an overcurrent setpoint, the comparator configured to supply an overcurrent trip signal when the current supplied to the one or more capacitive loads is greater than or equal to the overcurrent setpoint;
   a differentiator adapted to sense a voltage rate of change across the one or more capacitive loads and configured to supply a differentiator output signal representative thereof; and
   a summer coupled to receive a fixed reference setpoint signal and the differentiator output signal and configured, upon receipt thereof, to add the fixed reference setpoint signal and the differentiator output signal to thereby generate the setpoint signal and supply the setpoint signal to the comparator.

2. The circuit of claim 1, further comprising:
   conditioning circuitry coupled to the comparator and adapted to receive a current sensor output signal and configured, upon receipt thereof, to condition the current sensor output signal and supply the sensed current signal to the comparator.

3. The circuit of claim 2, further comprising:
   a current sensor coupled to the conditioning circuitry, the current sensor configured to sense the current being supplied to the one or more capacitive loads and supply the current sensor output signal to the conditioning circuitry.

4. The circuit of claim 3, wherein the current sensor comprises a resistance circuit.

5. The circuit of claim 1, further comprising:
   one or more controllable switches coupled in series with the one or more capacitive loads, each controllable switch configured to operate in an ON state, in which current may flow through the switch to the one or more capacitive loads, and an OFF state, in which current is prevented from flowing through the switch to the one or more capacitive loads.

6. The circuit of claim 5, wherein each controllable switch is (i) adapted to receive an ON command and an OFF command, (ii) responsive to the ON command to operate in the ON state, and (iii) responsive to the OFF command to operate in the OFF state.

7. The circuit of claim 6, further comprising:
   an overcurrent latch coupled between the comparator and the one or more switches, the overcurrent latch responsive to the overcurrent trip signal to generate the OFF command.

8. The method of claim 1, further comprising:
   coupling one or more controllable switches in series with the one or more capacitive loads, each controllable switch configured to operate in an ON state, in which current may flow through the switch to the one or more capacitive loads, and an OFF state, in which current is prevented from flowing through the switch to the one or more capacitive loads,
   wherein each controllable switch is (i) adapted to receive an ON command and an OFF command, (ii) responsive to the ON command to operate in the ON state, and (iii) responsive to the OFF command to operate in the OFF state.

9. The method of claim 8, further comprising:
   generating the OFF command in response to the overcurrent trip signal.

10. An overcurrent detection circuit for one or more capacitive loads, the circuit comprising:
    one or more controllable switches coupled in series with the one or more capacitive loads, each controllable switch configured to operate in an ON state, in which current may flow through the switch to the one or more capacitive loads, and an OFF state, in which current is prevented from flowing through the switch to the one or more capacitive loads;
    conditioning circuitry coupled to the comparator and adapted to receive a current sensor output signal representative of current being supplied to the one or more capacitive loads and configured, upon receipt thereof, to condition the current sensor output signal and supply a sensed current signal;
    a comparator coupled to receive the sensed current signal and a setpoint signal that is representative of an overcurrent setpoint, the comparator configured to supply an overcurrent trip signal when the current supplied to the one or more capacitive loads is greater than or equal to the overcurrent setpoint;

a differentiator adapted to sense a voltage rate of change across the one or more capacitive loads and configured to supply a differentiator output signal representative thereof; and a summer coupled to receive a fixed reference setpoint signal and the differentiator output signal and configured, upon receipt thereof, to add the fixed reference setpoint signal and the differentiator output signal to thereby generate the setpoint signal and supply the setpoint signal to the comparator.

11. The circuit of claim 10, further comprising:

a current sensor coupled to the conditioning circuitry, the current sensor configured to sense the current being supplied to the one or more capacitive loads and supply the current sensor output signal to the conditioning circuitry.

12. The circuit of claim 11, wherein the current sensor comprises a resistance circuit.

13. The circuit of claim 10, wherein each controllable switch is (i) adapted to receive an ON command and an OFF command, (ii) responsive to the ON command to operate in the ON state, and (iii) responsive to the OFF command to operate in the OFF state.

14. The circuit of claim 13, further comprising:

an overcurrent latch coupled between the comparator and the one or more switches, the overcurrent latch responsive to the overcurrent trip signal to generate the OFF command.

15. A method of detecting an overcurrent condition in a circuit that includes one or more capacitive loads, the method comprising the steps of:

sensing current being supplied to the one or more capacitive loads to thereby generate a sensed current;

sensing a voltage rate of change across the one or more capacitive loads to thereby generate a differentiator output;

adding the differentiator output to a fixed reference setpoint to thereby generate an overcurrent setpoint;

comparing the sensed current to the overcurrent setpoint; and supplying an overcurrent trip signal when the sensed current is greater than or equal to the overcurrent setpoint.

16. The method of claim 15, wherein the step of sensing current further comprises conditioning a current sensor output signal using conditioning circuitry.

17. The method of claim 15, wherein the step of sensing current comprises sensing a voltage drop across a resistance circuit.

\* \* \* \* \*

UNITED STATES PATENT AND TRADEMARK OFFICE
CERTIFICATE OF CORRECTION

PATENT NO. : 9,490,623 B2  
APPLICATION NO. : 14/546145  
DATED : November 8, 2016  
INVENTOR(S) : Marotta et al.

Page 1 of 1

It is certified that error appears in the above-identified patent and that said Letters Patent is hereby corrected as shown below:

On the Title Page (54): CAPACITVIVE LOAD OVERCURRENT DETECTION SYSTEM AND METHOD should be changed to (54): CAPACITIVE LOAD OVERCURRENT DETECTION SYSTEM AND METHOD Signed and Sealed this
Twenty-first Day of March, 2017

Michelle K. Lee
*Director of the United States Patent and Trademark Office*